X4475
W. Janes.
Making Stove-Pipe, &c,
Patented June 19, 1826
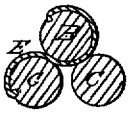
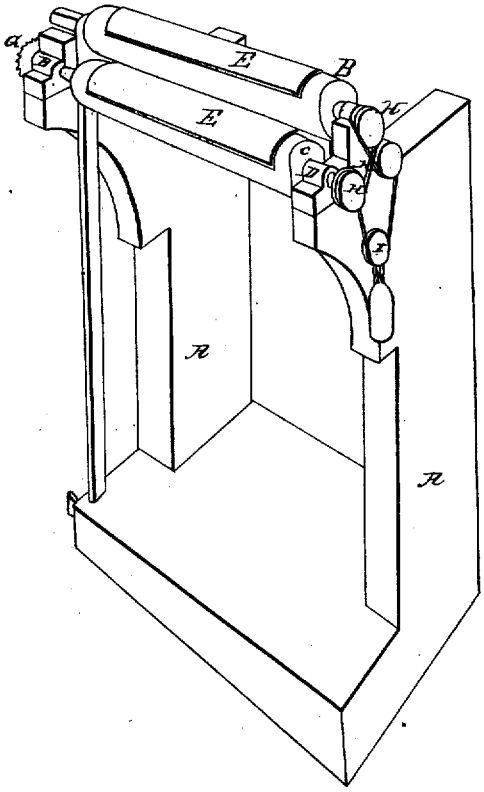
N. PETERS, PHOTO-LITHOGRAPHER, WASHINGTON, D. C.

X0004475 [illegible] 19. 1826 75

Walter James

Letters Patent. Dated June 19. 1826.

The schedule referred to in these Letters Patent and making part of the same
containing a description in the words of the said Walter James himself of his
improvement in the machine for bending tire for Carriage and other wheels,
metallic bands and hoops of all descriptions, stove pipe, factory cans, tin ware,
&c.

This invention consists in producing a uniform curve of any diameter to
tire for carriage and other wheels, metallic bands and hoops of all descriptions, stove
pipes for factory cans, tin ware &c. by means of three rollers of suitable lengths
diameter, and shape, to perform the work required.

These rollers are placed in a suitable frame two of which have different
bearings as herein after described; the third or upper roller to be placed per-
pendicularly to the centre between the other two in moveable boxes, operated by
wedges or screws, to bring it nearer to, or remove it farther from the other two
rollers, and being made fast at the proper distance, is put in motion by any
sufficient power when the article to be bent is introduced & drawn between
them & receive the curve required.

I first operated the machine with the rollers being placed between
the posts or stands, containing the moveable boxes that support the upper rol-
-ler which practise may be continued; but as in many cases it would be difficult
to disengage the article bent, from the machine without removing the upper roller
as an improvement, I have placed the two bottom rollers at one side of the said
posts or stands on bearings having different boxes which will admit of the
rollers being placed nearer to, or farther from, each other, as the nature of the
work may require. To prevent the upper roller from springing it
has at the end near where the operation is performed, a gudgeon on which
is placed a clasp passing to the bottom of the frame, and made fast by a
wedge or screw, which clasp is to be removed and replaced at each at each
article bent, if required. The rollers being thus situated, the articles may be slipped off at their ends, and any number of the same thickness introduced receive the same curve and removed in a similar manner, without any alteration of the upper roller. The shape of the rollers must correspond to that of the article to be bent, whether of a cylindrical or conical form; & so placed that their surfaces, at the nearest approach, shall be parallel to each other. ——— For bending stove pipes and other articles calculated to be locked, the locks must be turned previous to the operation; and one part of the lock introduced into a groove in one of the bottom rollers as in this case it will be necessary that each roller have grooves lengthwise to admit the parts to be locked beneath their surface, while in the act of bending; and should not the other part of the lock happen to meet the groove in the upper roller, the motion of the bottom rollers together with the article may be checked by means of a ratchet wheel and dog, and the upper roller slide round until that part of the lock will fall directly into the groove. And in bending tin ware, which is wired upon one edge the rollers should have corresponding grooves around them to admit the projecting part beneath their surface.

In bending tin &c. the bottom rollers in order to assist in drawing in the article to be bent, may receive motion from the upper roller by means of a band passing over the upper roller bottom and under the other two, and finally over a pulley which is regulated by a weight or otherwise, in order to produce a proper tension.

The rollers of this machine may be placed in a horizontal (or vertical position, and varied in size and proportion as judgment or fancy may dictate but however placed or varied, still their application to the above specified purposes, is what I claim as my discovery and invention.

Witnesses
O. Holt.
Ichabod Bulkley.

Walter Janes. Patent
Tin Bending
Machine
June 19th 1826

E+A.
[illegible]

[illegible] words — (784 wds)

100